(No Model.)
A. F. WEAVER.
GRINDSTONE SHAFT.
No. 298,046. Patented May 6, 1884.
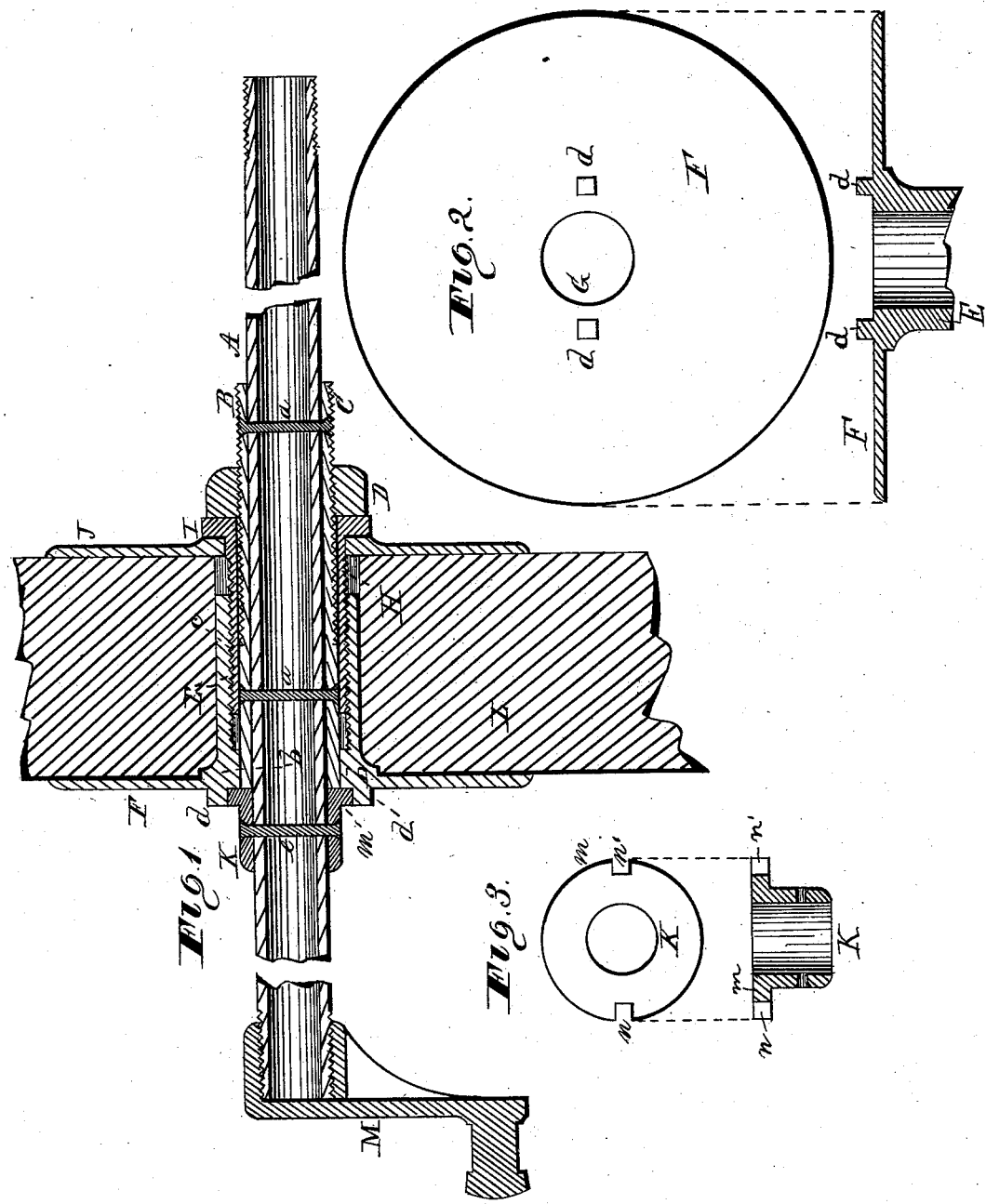
Witnesses.
J. H. Burridge.
C. H. Turney.
Inventor.
Arthur F. Weaver
W. H. Burridge
Atty.

UNITED STATES PATENT OFFICE.

ARTHUR F. WEAVER, OF CLEVELAND, OHIO.

GRINDSTONE-SHAFT.

SPECIFICATION forming part of Letters Patent No. 298,046, dated May 6, 1884.

Application filed March 11, 1884. (No model.)

*To all whom it may concern:*

Be it known that I, ARTHUR F. WEAVER, of Cleveland, in the county of Cuyahoga and State of Ohio, have invented a certain new and Improved Grindstone-Shaft; and I do hereby declare that the following is a full and complete description thereof.

The nature of this invention relates, especially, to a shaft on which to hang a grindstone, said shaft being made adjustable, that it may be adapted to grindstones of various thickness, and which is easily and readily applied to the stone and as easily and readily detached therefrom for the convenience of shipping the grindstone, or for other purposes.

A further and more full description of the invention will be found in the following specification, and illustrated in the accompanying drawings, making a part of the same, in which—

Figure 1 represents a longitudinal section of the shaft and device for securing it in the eye of the stone. Figs. 2 and 3 are detached sections.

Like letters of reference denote like parts in the drawings.

The shaft A, above referred to, is tubular, and consists of a piece of gas-pipe, the length and the diameter of which may be more or less, according to the size of the stone to be secured thereon. That portion of the shaft to be inserted in the eye of the stone is enlarged in diameter by closely fitting thereon a piece of larger pipe, B, secured in its connection with the shaft A by the rivets or pins *a*. The object of thus enlarging the diameter of the shaft is to obtain a screw-thread, C, for the nut D. On the enlargement of the shaft A is closely fitted at the part *b* a sleeve, E. The rest part of the sleeve is not close-fitting to the enlargement of the shaft, but is somewhat larger in diameter and provided with a female screw, as seen at *c*. Said sleeve is also provided with an annular flange, F, forming an integral part of the sleeve, a detached view of which is shown in Fig. 2, in which it will be seen that the flange is provided with a pair of studs, *d*, and a central hole, G, adapted to fit on over the enlargement of the shaft, as shown in Fig. 1. To the shaft A is also fitted a tubular screw, H, adapted to screw into the sleeve E. Said screw H is provided with a flange or collar, I, Fig. 1, of a diameter larger than the central opening in the follower J, fitting on the neck of the tubular screw H. Said follower corresponds in position and figure to the annular flange F, with which it forms a clamp for securing the shaft in the eye of the grindstone.

K is a collar fitting closely on the shaft A, and so arranged thereon as to abut against the end of the enlargement B of the shaft, as shown in Fig. 1. Said collar is made fast to the shaft by a rivet or pin, *e*. A detached view of said collar is shown in Fig. 3, in which it will be observed that in the periphery of the flange *m* of the collar there are two notches, *n n'*, adapted to engage, respectively, the studs *d d* of the flange F, as seen in Fig. 1.

Having described the construction and the several parts of the shaft and the appliances for securing it in the grindstone, the practical application thereto will be readily understood on examination of the drawings, and which is briefly as follows: The sleeve E is first inserted in the eye of the stone, (represented at L,) so that the flange F may lie flat against the side thereof. On the opposite side of the stone is adjusted in a corresponding manner the follower J, through which is passed the tubular screw H to the sleeve E, into which it is so far screwed as to clamp the stone between the flange F and follower J, as shown in Fig. 1. The shaft A, to which the collar K has been previously secured, is now inserted in the sleeve and the tubular screw so far as to bring the notches *n n'* into engagement with the lugs *d d* of the sleeve, and in tactual relation with the end of the sleeve and with the enlargement of the shaft. This engagement of the lugs with the said notches of the collar K prevents the shaft from turning around in the eye of the stone, while the stone, for being firmly clamped between the flange F and the follower J, is carried around with the revolving shaft operated by the crank M. The shaft connected to the stone, as above described, is prevented from being pulled out therefrom by the nut D, above alluded to. Said nut, as shown in the drawings, is screwed onto the threaded end of the enlargement of the shaft and hard against the flange or collar I of the screw H, thereby making the shaft in its connection with the grindstone firmly secure, readily and easily applied for mounting the stone in its frame, and as easily and readily detached therefrom for the greater convenience of shipping the stones.

I desire it to be understood that I do not confine myself to a tubular shaft, as herein shown and described, for the reason that a solid shaft may be used instead without changing, essentially, the nature of my invention, herein set forth.

As hereinbefore said, the shaft is adjustable—that is to say, it can be applied to grindstones of various thickness, which will be apparent on examination of the drawings, Fig. 1, in which it will be seen that the tubular screw H will penetrate the sleeve E more or less, according to the thickness of the stone.

What I claim as my invention, and desire to secure by Letters Patent, is—

1. In combination with a grindstone, a sleeve provided with a female screw, annular flange, follower J, and tubular screw adapted to engage the screw of the said sleeve for clamping the stone between the flange F and follower, substantially in the manner as described, and for the purpose specified.

2. In combination with the sleeve E, having a flange, F, and projections or studs $dd$, follower and tubular screw constructed and adapted to each other, as described, the shaft A, provided with a threaded enlargement, and having secured thereon a collar, K, with peripheral notches registered to engage the studs of the said sleeve, and binding-nut D, substantially as described, and for the purpose specified.

3. In combination with a grindstone, the flanged sleeve E, provided with a female screw and studs; follower J, tubular screw and shaft having an enlargement provided with a threaded end, binding-nut, and notched collar K, constructed, arranged, and adapted to each other, substantially in the manner as described, and for the purpose set forth.

In testimony whereof I affix my signature in presence of two witnesses.

ARTHUR F. WEAVER.

Witnesses:
J. W. BURRIDGE,
C. H. TURNEY.